United States Patent [19]

Tomm et al.

[11] 4,437,555

[45] Mar. 20, 1984

[54] MULTIPLE DISK CLUTCH WITH SPRING CONTROL LIFT

[75] Inventors: Dagwin Tomm, Schweinfurt; Erich Scheer, Escherndorf, both of Fed. Rep. of Germany

[73] Assignee: Fichtel & Sachs AG, Schweinfurt, Fed. Rep. of Germany

[21] Appl. No.: 314,741

[22] Filed: Oct. 23, 1981

[30] Foreign Application Priority Data

Nov. 3, 1980 [DE] Fed. Rep. of Germany ....... 3041341

[51] Int. Cl.³ ..................... F16D 13/56; F16D 13/75
[52] U.S. Cl. ............................ 192/70.21; 192/70.18; 192/70.28; 192/111 A
[58] Field of Search .................. 192/52, 70.18, 70.21, 192/70.28, 111 A; 188/71.8, 218 XL

[56] References Cited

U.S. PATENT DOCUMENTS

| | | | |
|---|---|---|---|
| 2,385,517 | 9/1945 | Hunt | 192/70.21 |
| 2,540,965 | 2/1951 | Schellinger | 192/70.21 X |
| 3,286,795 | 11/1966 | Barrett et al. | 192/111 A X |
| 3,360,089 | 12/1967 | Cockerill et al. | 192/111 A |
| 3,403,754 | 10/1968 | Barrett et al. | 192/111 A X |
| 3,561,577 | 2/1971 | Binder | 192/111 |
| 4,257,502 | 3/1981 | Riese | 192/111 A X |

FOREIGN PATENT DOCUMENTS 1755032  4/1971  Fed. Rep. of Germany .

*Primary Examiner*—Allan D. Herrmann
*Attorney, Agent, or Firm*—Toren, McGeady and Stanger

[57] ABSTRACT

In a multiple disk clutch, a first clutch disk is located between a flywheel which forms a counter-pressure plate and an intermediate plate and a second clutch disk is located between the intermediate plate, on the opposite side from the first clutch disk, and a pressure plate. The two clutch disks are attached to an output shaft so they rotate with but are axially slidable relative to the shaft. A spring acting on the intermediate plate lifts the intermediate plate when the clutch is disengaged. A lifting distance limitation device is associated with the intermediate plate and limits its lifting distance. The limitation device includes a self-acting readjustment device which readjusts the lifting distance as a function of the wear on the friction linings of the first clutch disk. A spring member extends between the intermediate plate and the pressure plate and acts on the intermediate plate in the engagement direction when the clutch is being engaged.

11 Claims, 6 Drawing Figures

MULTIPLE DISK CLUTCH WITH SPRING CONTROL LIFT

SUMMARY OF THE INVENTION

The present invention is directed to a multiple disk clutch, in particular a double disk clutch, including a flywheel acting as a counter-pressure plate, an intermediate plate spaced from the flywheel, a first clutch disk positioned between the flywheel and the intermediate plate, a spring loaded pressure plate located on the opposite side of the intermediate plate from the flywheel and a second clutch disk located between the intermediate plate and the pressure plate. Both of the clutch disks are mounted for rotation on a driven shaft, however, they are axially movable relative to the shaft. A lifting spring affords a lifting action on the intermediate plate. A lifting distance limitation device associated with the intermediate plate includes a self-acting readjustment device which operates as a function of the wear on the friction lining.

A double disk clutch of the general type described above is disclosed in German patent 1 755 032. In such clutches, however, there has been the problem during the engaging operation that the increase in torque does not proceed in a continuous manner. For example, during the engaging procedure, the second clutch disk positioned between the intermediate plate and the pressure plate, initially receives a torque which depends on the spring force of the lifting springs on the intermediate plate. As a result, when the clutch pedal is released, the second clutch disk suddenly transmits a torque without a smooth transition and the torque is sometimes sufficient to set in motion the vehicle contains the clutch. When the clutch is being engaged, the intermediate plate, the pressure plate and the second clutch disk move together in the direction of the first clutch disk and the further increase in torque is then dependent on the type of lining spring suspension in the first clutch disk.

Therefore, it is the primary object of the present invention, to provide a double disk clutch in which the process of releasing the clutch pedal takes place smoothly and without any sudden build up in the torque.

In accordance with the present invention, a spring is positioned between the pressure plate and the intermediate plate so that it acts on the intermediate plate in the direction of engagement when the clutch is being engaged. The arrangement of the additional spring has the effect that the lifting motion of the first clutch disk is taken up between the flywheel and the intermediate plate as this first clutch disk commences the build up of the torque transfer. As a result, it is assured that the build up of the transferable torque commences continuously and smoothly. Due to its manner of operation, such a double disk clutch can be used like a normal clutch.

In one embodiment of the present invention the self-acting readjustment device and the lifting distance limitation device are arranged one behind the other and parallel to a lifting spring acting on the intermediate plate. A spring member includes at least one spring extending parallel to the lifting spring so that it acts on the intermediate plate. Since this spring can be in the form of a leaf spring it permits very simple mounting of the second clutch disk and the pressure plate.

By arranging the self-acting readjustment device and the lifting distance limitation device one behind the other it is possible to use a single spring for lifting the intermediate plate while disengaging the clutch. Further, during engagement of the clutch the spring assures the proper shifting in the direction of the first clutch disk. Such an arrangement can be supplied at an especially low price. The intermediate plate and the pressure plate are secured for rotation with one of the flywheel or the clutch housing by tangential straps and merely provide a pushing and pulling action during torque transfer. Such tangential straps are utilized merely to transfer torque and do not embody any initial tension for generating a lifting distance.

In an especially simple and economical arrangement of space, the tangential straps extend between lugs on the intermediate pressure plate with the lugs offset in the circumferential direction. The readjustment device and the tangential straps are mounted on lugs on the intermediate plate. A sliding part of the readjustment device has a stop surface for the pressure plate extending perpendicularly of the releasing direction. The stop surface is arranged opposite the head of the fastening rivet for the tangential straps and the lugs for the pressure plate and the surfaces adjoin one another in the engaged position. Further, the spring member is formed as an individual plate spring or as a plate spring pack. Due to the arrangement of the plate spring or plate spring pack it is possible to adjust exactly the lifting distance between the second clutch disk and the intermediate plate on one hand and the pressure plate on the other hand, and at the same time to obtain a faultless guidance for the plate springs of the spring member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
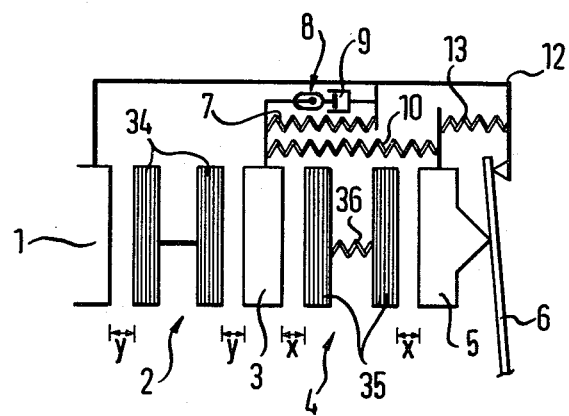
FIG. 1 is a schematic showing of a double disk clutch embodying the present invention.
Figure 2:
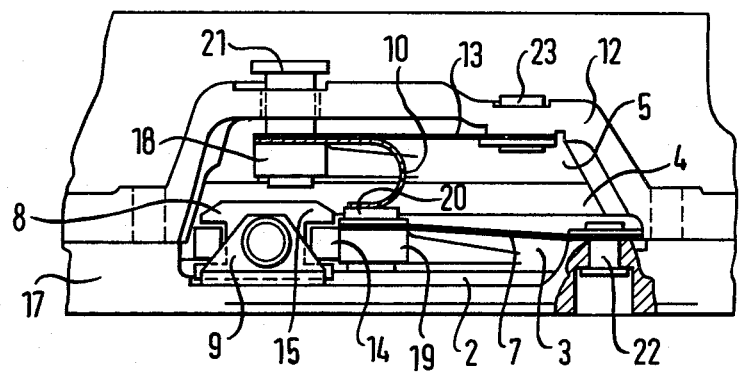
FIG. 2 is a partial elevational view, partly in section, of the clutch illustrated in FIG. 1.

FIG. 1 is a schematic showing of a double disk clutch in the disengaged position. In FIG. 1 at the left-hand end there is a flywheel 1 followed in succession within the clutch housing 12 by the following: a first clutch disk 2, an intermediate plate 3, a second clutch disk 4, a pressure plate 5 and a diaphragm or plate spring 6. In this arrangement, diaphragm spring 6 is supported on its outer periphery on the housing 12 and on a smaller peripheral surface on the pressure plate 5. The spring 6 is prestressed so that it tends to clamp together the parts between the pressure plate 5 and the flywheel 1 for transferring torque from the flywheel to the two clutch disks 2, 4. These two clutch disks are secured for rotation with an output shaft, not shown, but they are axially movable along the shaft. Intermediate plate 3 and pressure plate 5, as shown in more detail in FIG. 2, are connected with the clutch housing 12 so that they rotate with the housing but are axially movable relative to it. A lifting spring 13 acts on the pressure plate in all of its operational conditions to guarantee contact with the diaphragm spring 6. Located between the intermediate plate 3 and the clutch housing 12 is lifting distance limitation device 8 along with an automatically operating readjustment device 9 to compensate for wear on the friction lining 34 of the first clutch disk 2. To assure the lifting movement of the intermediate plate 3, a lifting spring 7 is arranged in parallel with the lifting distance limitation device 8 and the readjustment device 9. Lifting spring 7 guarantees a lifting distance y for the first clutch disk 2. Lifting distance y, shown in about equal parts between one side of the clutch disk 2 and the flywheel 1 and between the other side of the first clutch disk 2 and the intermediate plate. This lifting distance is limited by the lifting distance limitation device 8. Lifting distance x for the second clutch disk 4 relative to the intermediate plate 3 and the pressure plate 5 follows automatically by a corresponding releasing movement of the pressure plate 5. Moreover, a spring or spring member 10 extends between the intermediate plate 3 and the pressure plate 5 and in the illustrated disengaged clutch position it is essentially free of any load. When the clutch is being engaged, this spring member 10 assures that the lifting distance y of the first clutch disk is used up initially, that is, the intermediate plate 3 is moved in the direction of engagement by the force of the spring member 10 developed by the engagement movement of the pressure plate 5. As indicated in FIG. 1, the first clutch disk 2 has a rigid arrangement of the friction linings 34, while the friction linings 35 on the second clutch disk 4 have a lining spring suspension 36.

FIG. 2 displays a partial outside view of the double disk clutch illustrated in FIG. 1. This figure does not show the flywheel 1 which would be located immediately adjacent and below the intermediate housing 17. It should be noted that clutch housing 12 is disconnectably attached to the flywheel 1 via the intermediate housing 17. Dividing the housing into two parts affords a simple mounting of the clutch. The intermediate plate 3 is guided on the intermediate housing 17 so that it is axially movable but secured for rotation, via springs 7 in the form of tangential straps equally distributed around the circumference of the plate. Springs 7 provide the rigid connection for rotation and also provide a spring force in the lifting direction. The mounting of the springs on the intermediate housing 17 is effected by rivets 22 and on the intermediate plate 3 by rivets 20 at the lugs 19. In the same manner, the pressure plate 5 is mounted on the clutch housing so that it rotates with it but is axially movable relative to the housing. This connection is effected by lifting springs 13 also in the form of tangential straps. The lifting springs 13 are secured to the housing by rivets 23 and to the pressure plate 5 by rivets 21 at the lugs 18. It should be noted that the fastening rivets 21 have an extension passing through an opening in the housing 12 and when the clutch is disassembled a collar on the fastening rivets contacts the housing to avoid that the diaphragm spring 6 overextends the lifting springs 13 during assembly. The spring 10 which provides the engagement movement of the intermediate plate 3 is, as shown in FIG. 2, constructed as a leaf spring bent into the shape of a semi-circle. This leaf spring 10 is also riveted to the pressure plate 5 between the lugs 18 and the lifting springs 13 with its free end in contact with the head of the rivet 20 which fastens the lifting springs 7 to the lugs 19. In the lifted or disengaged position of the clutch as illustrated, spring 10 just makes contact without providing any initial biasing action. Moreover, the readjustment device 9 for the wear on the friction linings 34 is mounted on the intermediate housing 17 with the lifting distance limitation device 8 represented by the play between the shoulder 14 on the intermediate plate and the sliding part 15 on the readjustment device 9. In the drawing, the two clutch disks 2, 4 can be seen from the outside.

Figure 5:
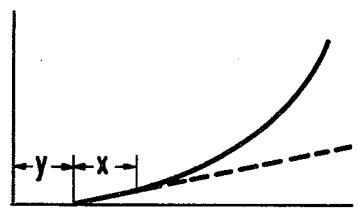
FIG. 5 is a graphic representation of the proportional distances and torque build up during the engagement of the clutch.

Based on the showing in FIGS. 1 and 2, the double disk clutch functions in the following manner:

Starting with the disengaged position shown in FIG. 1, engagement of the clutch takes place by means of the diaphragm spring 6 which biases the pressure plate 5 in the direction of the flywheel 1. The movement of the intermediate plate 3 and the pressure plate 5 is of about equal magnitude so that it is assured that the lifting distance y of the first clutch disk 2 is overcome initially. After lifting distance y has been overcome, a transferable torque builds up at the first clutch disk 2 and increases continuously and is determined by the force of the spring member 10. Due to the rigid arrangement of the friction linings 34, it is now possible to reduce, during further engagement, the lifting distance x of the second clutch disk 4. As the second clutch disk 4 is secured between the pressure plate 5 and the intermediate plate 4, a stronger increase in the transferable torque of the characteristic curve takes place and continues until the travel of the lining spring suspension 36 is used up and the full force of the diaphragm spring 6 acts on both of the clutch disks 2, 4. Build up of the transferable torque is shown in FIG. 5. The travel of the pressure plate is illustrated on the abscissa and the torque being built up is shown on the ordinate. While the lifting distance y is being overcome, no torque transfer takes place. After the lifting distance y has been eliminated, the transferable torque increases in an approximate linear manner corresponding to the dotted line, and the slope of this line is a function of the resilience of spring member 10. After the lifting distance x has been taken up, there is no continuous increase of the torque through the increase of a resilience of the lining spring suspension 36. Wear on the friction lining 34 of the first clutch disk 2 is compensated for in a known manner by the readjustment device 9. During clutch engagement, the lifting distance limitation device 8 traverses the presumed lifting distance y. If because of wear on the lining, the travel of the intermediate plate 3 increases and becomes greater than the assumed play in the lifting distance limitation device 8, the force of the diaphragm spring 6 pushes the sliding part 15 of the readjustment device 9 further in the direction of the flywheel where it is secured.

The assembly of this double disk clutch is quite simple, since the spring member 10 with its resilient free end contacts the exterior of the rivet 20. After the first clutch disk has been set in place, the intermediate housing 17 with the intermediate plate 3 can be placed on the flywheel with the subsequent placement of the readjustment device 9. Next, the second clutch disk 4 is set in place on the output shaft and then the clutch housing 12 along with the pressure plate 5 is set in place.

Figure 3:
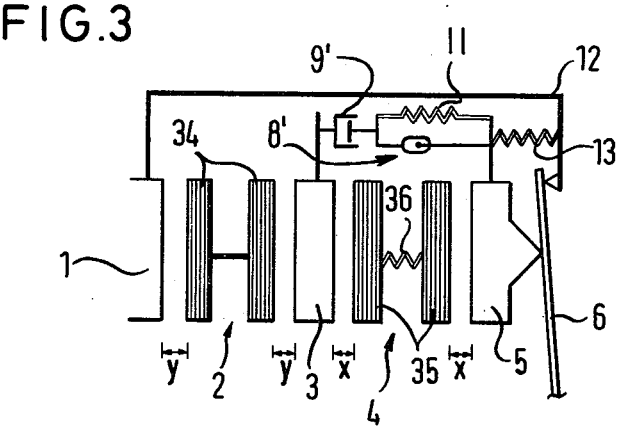
FIG. 3 a schematic representation of another double disk clutch embodying the present invention.
Figure 4:
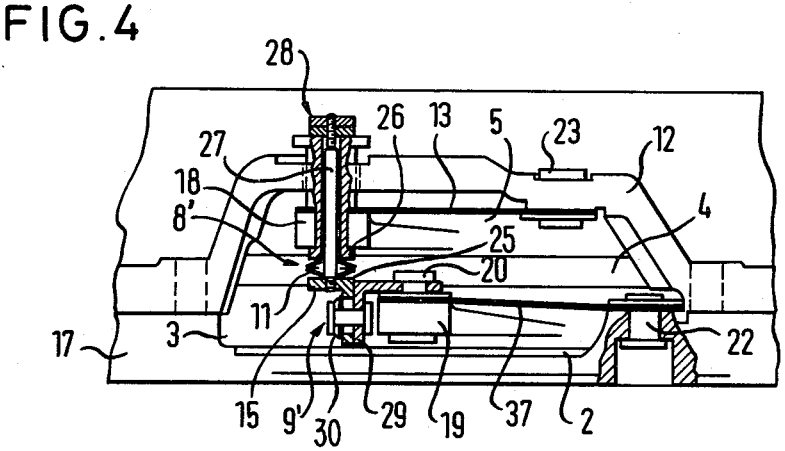
FIG. 4 is a view, similar to FIG. 2, illustrating the clutch shown in FIG. 3.

The essential difference between the double disk clutch shown in FIGS. 3 and 4 and the one described above, is that the lifting distance limitation device 8' and the readjustment device 9' are placed between the intermediate plate 3 and the pressure plate 5. In addition, a spring member 11 is inserted between the intermediate plate and the readjustment device 9' in parallel with the lifting distance limitation device 8'. The other component parts of the clutch correspond to those shown in FIGS. 1 and 2. In this clutch arrangement, a gentle increase in the transferable torque is achieved in accordance with FIG. 5.

As is evident from FIG. 4, the outward appearance of the double disk clutch is slightly different from that shown in FIG. 2. Intermediate plate 3 is supported on the intermediate housing 17 by tangential straps 37 and while it is connected for rotation with the housing it is axially movable relative to it. In this arrangement, the tangential straps 37 merely transfer the torque and do not function in any way in the lifting operation of the intermediate plate 3. Tangential straps 37 are fastened to the intermediate housing 17 by rivets 22 and to the lugs of the intermediate plate 3 by rivets 20. The pressure plate 5 is held on the clutch housing 12 by lifting springs 13 in the form of tangential straps. The straps are secured by rivets 23 and 26. Lugs 18 holding the rivets 26 are offset in the circumferential direction relative to the lugs 19 of the intermediate plate 3 in a clockwise direction when viewing the clutch from the direction of the diaphragm spring 6. The fastening rivets 26 provide a safeguard against the overextension of the lifting springs 13. In addition, each fastening rivet 26 is provided with a longitudinal borehole extending parallel to the axis of rotation of the clutch. In each of these boreholes an axle 27 is axially movable. The axle 27 has a stop 28 at its end facing toward the diaphragm spring 6 and the stop is in the form of a nut and a lock nut. The opposite end of the axle is arranged in the sliding part 15 of the readjustment device 9' and the readjustment device is fastened by an angle to the lug 19 of the intermediate plate. Between the sliding part 15 and the fastening rivet 26, spring member 11 in plate spring form is arranged on the axle 27. These spring members 11 are arranged individually or as a pack, and serve to transfer the engagement movement of the pressure plate 5 to the intermediate plate 3. At the same time, two stop surfaces opposite one another on the sliding part 15 and the fastening rivet 26 produce the lifting distance y for the first clutch disk 2. The distance between these two surfaces, minus, of course, the axial strength of the spring members 11, is represented by the lifting distance limitation device 8'.

Figure 6:
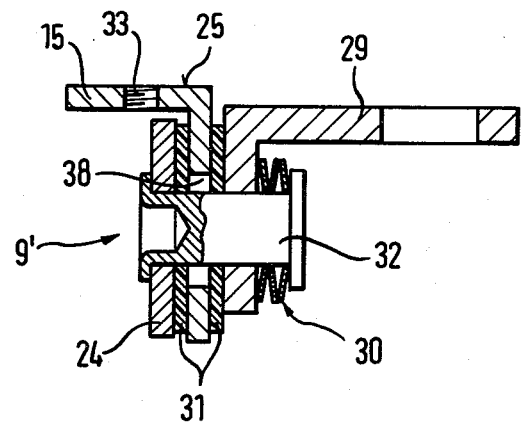
FIG. 6 is an enlarged sectional view of an adjusting device forming a part of the present invention.

In FIG. 6, a section is shown through the readjustment device 9' illustrated in FIG. 4. By means of a fastening angle 29, the readjustment device 9 is secured on the lug 19 of the intermediate plate 3. A rivet 32 extends through one leg of the fastening angle and supports the plate springs 30 which generate a frictional force relative to the movement of the sliding part 15. The plate springs 30 are located on one side of the leg of the fastening angle 29 and a pair of friction linings 31 are located on the opposite side with the sliding part 15 clamped between them. In FIG. 4 the spring 30 is illustrated on the opposite side of the fastening angle 29. A disk 24 is located between the end of the rivet 32 extending through the sliding part 15 and the adjacent friction lining 31. An elongated slot 38 forms an opening in the sliding part 15 through which the rivet extends. Moreover, a stop surface 25 is provided on the sliding part 15 and is located opposite to and parallel with the fastening rivet 26 shown in FIG. 4. The combination of the stop surface 25 and the fastening rivet 26 affords the readjustment of the wear on the second clutch disk 4. Moreover, a threaded bore 33 is located through the stop surface 25 of the sliding part and is arranged to have the axle 27 screwed into it.

The double disk clutch shown in FIGS. 3, 4, 5 and 6 operates in the following manner: In the following explanation of the engagement operation of the clutch, the description commences with the fully disengaged position shown in FIG. 3. In this figure the clutch disk 2 is indicated as having a lifting distance y relative to the flywheel 1 and to the intermediate plate 3. The clutch disk 4 has a lifting distance x relative to the intermediate plate 3 and to the pressure plate 5. By releasing the diaphragm spring 6, pressure plate 5 is moved toward the flywheel 1. At the same time, the pressure plate moves the intermediate plate in the same direction by means of the spring member 11 and the readjustment device 9 which in this instance can be considered a rigid component. The spring member 11, whether provided as an individual plate spring or as a plate spring pack, is practically without any initial tension. Accordingly, first the lifting distance y of the first clutch disk is eliminated and, as can be seen from FIG. 5, after this distance is taken up, the first clutch disk 2 commences a torque transfer which runs a linear course and is dependent on the characteristic curve of the spring members 11. While the spring members 11 are now compressed, the lifting distance x between the intermediate plate and the pressure plate is taken up at which time the clutch disk 4 starts to transfer torque which has now increased more strongly and is no longer merely a linear factor. Until the transfer of the maximum possible torque corresponding to the resilience of the diaphragm spring, the torque transferred increases in correspondence to the increase in the resilience of the lining spring suspension 36 of the clutch disk 4. In the fully engaged position, the lifting distance limitation device 8 is in the opposite final position to that shown in FIG. 3. The arrangement of the lifting distance limitation device 8 and the readjustment device 9 between the intermediate plate 3 and the pressure plate 5 allows automatically for any wear on the friction linings 35 of the clutch disk 4. With the wear on these friction linings 35, the pressure plate, as the clutch is being engaged, is under the biasing action of the spring plates moved closer to the intermediate plate 3 than during the preceding engagement operation. The extent to which it is moved closer depends upon the wear involved. While this movement takes place, the fastening rivet 26 together with the flat-pressed spring member 11 strike against the stop surface 25 on the sliding part 15 and push the sliding part, depending on the wear, in the direction of the flywheel 1. During any subsequent disengagement, the spring members 11 restore the original lifting play x between the intermediate plate 3 and the pressure plate 5 with the axle 27, by means of the stop 28 and the threaded bore 33 in the part 15, ensuring that the intermediate plate 3 along with the pressure plate 5 traverses the lifting distance y for the first clutch disk 2. At the same time, the frictional force of the readjustment device 9 must be adjusted so that it can transfer the lifting movement of the intermediate plate 3, however, it is carried out to a lesser degree than the force of the spring 6 for readjusting the wear distance.

In each of these two clutch embodiments, in FIGS. 1 and 2 or in FIGS. 3 and 4, the spring members 10 or 11 serve the purpose as shown in FIG. 5 of affording a smooth increase in the transferable torque as the clutch is being engaged. These spring members also assure, during the disengagement of the clutch, that initially the lifting distance x for the second clutch disk 4 is produced and then followed by the lifting distance y for the clutch disk 2 with the lifting distance y being covered jointly by the pressure plate 5 and the intermediate plate 3.

While specific embodiments of the invention have been shown and described in detail to illustrate the application of the inventive principles, it will be understood that the invention may be embodied otherwise without departing from such principles.

We claim:

1. Multiple disk clutch, such as a double disk clutch, includes a housing, a flywheel acting as a counter-pressure plate, an intermediate plate spaced from said flywheel, a first clutch disk positioned between said flywheel and intermediate plate, a spring-loaded pressure plate spaced from said intermediate plate on the opposite side thereof from said first clutch disk, a second clutch disk positioned between said intermediate plate and said pressure plate, said first and second clutch disks arranged to be mounted on a shaft so that said disks rotate with the shaft and are axially movable relative to the shaft, spring means connected to said intermediate plate for lifting said intermediate plate, said spring means including a lifting distance limitation device and an automatic readjustment device functioning in accordance with the wear on said first clutch disk, wherein the improvement comprises that said spring means includes a spring member acting on said intermediate plate in the direction of the engagement of the clutch while the clutch is being engaged, a lifting spring for lifting said intermediate plate, said lifting distance limitation device and readjustment device located one behind the other and disposed in parallel with said lifting spring, and said spring member having at least one spring disposed parallel to said lifting spring and connected to said pressure plate.

2. Multiple disk clutch, as set forth claim 1, wherein said at least one spring is a leaf spring.

3. Multiple disk clutch, as set forth in claim 2, wherein tangential straps secure said intermediate plate and said pressure plate to one of said flywheel or housing for effecting rotation therewith, lugs located on said intermediate plate and said pressure plate and offset in the circumferential direction thereof, said lugs attaching said tangential straps to said intermediate plate and pressure plate, rivet means for securing said spring member and said tangential straps associated with said pressure plate to said lugs on said pressure plate on the side thereof facing away from said flywheel and said spring member being shaped at least in part in the form of a semicircle extending from said pressure plate toward said intermediate plate, rivet means for connecting said tangential straps to said lugs on said intermediate plate, and the end of said spring member spaced from said pressure plate being in contact with said rivet means connecting said tangential straps to said intermediate plate.

4. Multiple disk clutch, such as a double disk clutch, includes a housing, a flywheel acting as a counter-pressure plate, an intermediate plate spaced from said flywheel, a first clutch disk positioned between said flywheel and flywheel and intermediate plate, a spring-loaded pressure plate spaced from said intermediate plate on the opposite side thereof from said first clutch disk, a second clutch disk positioned between said intermediate plate and said pressure plate, said first and second clutch disks arranged to be mounted on a shaft so that said disks rotate with the shaft and are axially movable relative to the shaft, spring means connected to said intermediate plate for lifting said intermediate plate, said spring means including a lifting distance limitation device and an automatic readjustment device functioning in accordance with the wear on said first clutch disk, wherein the improvement comprises that said spring means includes a spring member acting on said intermediate plate in the direction of the engagement of the clutch while the clutch is being engaged, said first clutch disk and second clutch disk each having friction linings thereon, with said friction linings on said first clutch disk being disposed in a rigid arrangement and a spring suspension incorporated in said friction linings on said second clutch disk.

5. Multiple disk clutch such as a double disk clutch, includes a housing, a flywheel acting as a counter-pressure plate, an intermediate plate spaced from said flywheel, a first clutch disk positioned between said flywheel and intermediate plate, a spring-loaded pressure plate spaced from said intermediate plate on the opposite side thereof from said first clutch disk, a second clutch disk positioned between said intermediate plate and said pressure plate, said first and second clutch disks arranged to be mounted on a shaft so that said disks rotate with the shaft and are axially movable relative to the shaft, spring means connected to said intermediate plate for lifting said intermediate plate, said spring means including a lifting distance limitation device and an automatic readjustment device functioning in accordance with the wear on said first clutch disk, wherein the improvement comprises that said spring means includes a spring member acting on said intermediate plate in the direction of the engagement of the clutch while the clutch is being engaged, said lifting distance limitation device and readjustment device located one behind the other between said intermediate plate and said pressure plate, and said spring member disposed in parallel to said lifting distance limitation device with said spring member located between said intermediate plate and said pressure plate.

6. Multiple disk clutch, as set forth in claim 5, said spring member in the disengaged position and when said intermediate plate has been released, is essentially without any initial tension.

7. Multiple disk clutch, as set forth in claim 6, wherein tangential straps secure said intermediate plate and said pressure plate to one of said flywheel or said clutch housing for rotation therewith, and said tangential straps secured to said intermediate plate are arranged to provide only pulling and pushing forces for the torque transfer effected by the clutch.

8. Multiple disk clutch, as set forth in claim 7, including lugs on said intermediate plate and on said pressure plate for attaching said tangential straps thereto, said lugs being offset relative to one another in the circumferential direction, said readjustment device is connected with said tangential straps associated with said intermediate plate to said lugs on said intermediate plate, said readjustment device including a sliding part having a stop surface for said pressure plate with said stop surface extending perpendicularly to the engaging-disengaging movement of the clutch, fastening rivets attach said tangential straps associated with said pressure plate to said lugs on said pressure plate and said stop surface on said sliding part is arranged opposite the head of the fastening rivets in the lugs on said pressure plate and said stop surface and the heads of said fastening rivets adjoining one another in the engaged position of the clutch.

9. Multiple disk clutch, as set forth in claim 8, wherein said spring member is formed as an individual plate spring.

10. Multiple disk clutch, as set forth in claim 8, wherein said spring member is formed as a plate spring pack.

11. Multiple disk clutch, as set forth in claims 9 or 10, wherein said spring member in plate form is positioned between said stop surface on said sliding part and the head of said rivet securing said tangential straps to said lugs on said pressure plate, said rivets in said lugs on said pressure plate having longitudinal boreholes extending therethrough, an axle extending through each said borehole, said axles being movable in the longitudinal direction of the boreholes for an amount corresponding to the deflection of said spring member and said axle is mounted in said sliding part of said readjustment device, and the opposite end of said axle from said sliding part has a stop thereon.

* * * * *